April 17, 1934.　　　C. E. KORNELUK　　　1,955,504
BRAKE EQUALIZING DEVICE
Filed Jan. 15, 1932
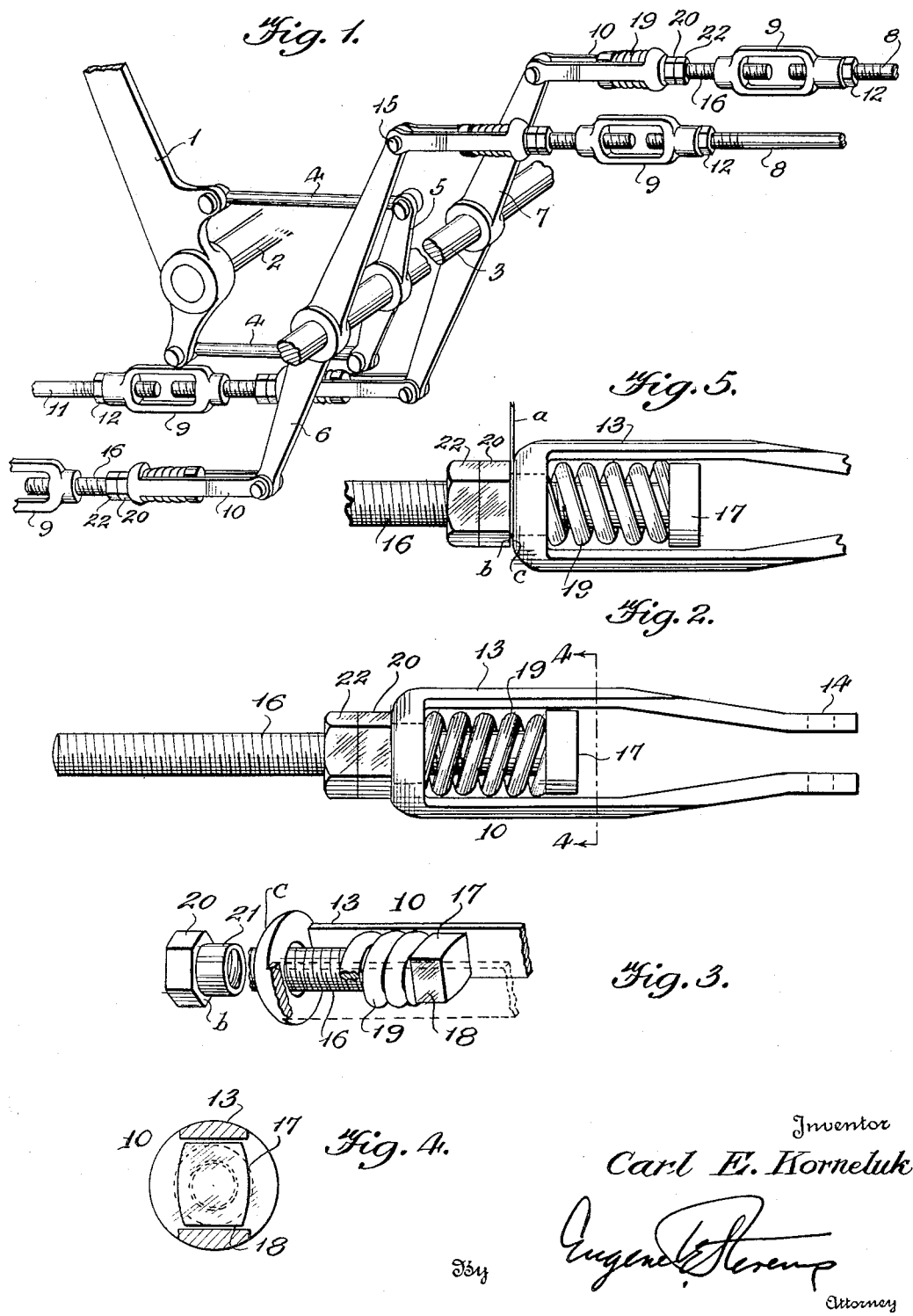
Inventor
Carl E. Korneluk.

Patented Apr. 17, 1934

1,955,504

UNITED STATES PATENT OFFICE 1,955,504

BRAKE EQUALIZING DEVICE

Carl E. Korneluk, Baltimore, Md.

Application January 15, 1932, Serial No. 586,860

8 Claims. (Cl. 188—18)

The present invention relates to a brake operating means particularly adapted for equalizing the braking forces at the vehicle wheels of an automobile.

The principal object of the invention is the provision of novel resilient coupling members adapted to be inserted in the linkage connections between the brake pedal, hand lever or other manually operated member and the brakes at the front and rear of the vehicle, said resilient coupling members being initially adjusted to transmit predetermined forces to the brakes.

A further object of the invention is the provision of adjusting means which is accessible to the operator to take up for wear of the brake bands and to adjust the coupling members to transmit the desired equalized braking forces to the vehicle wheels from the pedal or other point of application of power.

Other objects and advantages will become readily apparent from the following detailed description and the accompanying drawing showing a preferred embodiment of the invention.

In the drawing:

Figure 1 is a fragmentary perspective view showing the application of the invention and the preferred location of the initially stressed resilient means in the linkage connections between the brake pedal and the vehicle brakes;

Figure 2 is a detail of the resilient means or coupling forming the subject matter of the present invention;

Figure 3 is a fragmentary detail perspective view of the invention;

Figure 4 is a sectional view taken on the line 4—4 of Figure 2; and

Figure 5 is a fragmentary view showing the application of means for gauging the equalized pressures applied to the brakes.

In the drawing the numeral 1 designates the foot brake pedal pivotally mounted on a shaft or stud 2 and operatively connected to the rock shaft 3, journaled in the side frames, by means of the pair of links 4, 4 and the double-arm lever 5 secured to the rock shaft 3. Also, rigidly secured to the shaft 3 is a pair of lever arms 6 and 7, each lever having an arm extending upwardly from the shaft and an arm extending downwardly. Brake rods 8 extending to the rear brakes of the vehicle and connected to the brake mechanism associated with the rear wheels in a well-known manner are pivotally connected to the upper arms of the pair of double-arm levers 6 and 7 through the interposed turn buckles 9 and the resilient couplings, designated generally by the numeral 10, forming the subject matter of the present invention. The brake rods 11 are similarly connected to the brake mechanism associated with the front wheels and are pivotally connected to the downwardly extending arms of the double- arm levers 6 and 7 through the turn buckles 9 and resilient couplings 10, interposed between the brake rods and the double-arm levers. The operative length of the brake rods to take up wear in the brakes is adjusted by means of the turn buckles 9 by turning the rods and locking them in position by the lock nuts 12. The turn buckle may also be preferably provided with right and left hand threaded openings cooperating with corresponding threaded screws on the couplings and brake rods so that the required adjustment for wear may be effected by simply turning the turn buckle the required amount and locking it in position by means of the lock nut 12 associated therewith.

The resilient means interposed in the brake operating mechanism between the foot pedal and the brakes is designed to insure the application of equal braking forces by the rear brakes and equal braking forces by both of the front brakes, the couplings being initially adjusted to insure the application of equalized braking forces. Referring particularly to Figures 2, 3 and 4 it will be observed that each of the resilient devices generally designated 10 and interposed in the brake operating mechanism comprises a yoke member 13 of U-shaped form having the open end thereof formed to closely straddle the ends of the double-arm levers 6 and 7 and apertured, as at 14, to receive a fastening element 15 to pivotally connect the resilient couplings to the double-arm levers carried by the rock shaft 3. A threaded rod 16 having a head 17 is slidable through the bight portion of the yoke member and the head is preferably provided with opposed flats 18 to prevent turning of the rod within the member. A compression spring 19 is interposed between the shoulder of the head 17 and the bight portion of the yoke member. A nut or collar 20 having a reduced sleeve portion 21 adapted to fit closely within the aperture in the bight portion of the yoke member is also provided on the rod and serves the purpose of taking the thrust of the spring and for adjusting the spring to a desired predetermined compression. A lock nut 22 is also threaded on the stem of the rod 16 to retain the desired adjustment of the compression spring. The threaded end of the rod extends into a turn buckle 9 for the brake rod so that the relation of the brake shoe to the drum can be adjusted and the adjustment secured by means of the lock nut 12 threaded on the brake rod.

The resilient coupling means and the turn buckles for adjusting the operative length of the brake rods are all located in proximity to the brake pedal so as to be readily accessible to the operator by removing the floor boards of the vehicle.

In the practical embodiment of my invention I preferably select coil springs 19 absolutely uniform in resistance to compression and also uniform in length when in a coil-to-coil or completely compressed or compacted state, and when in use in a four wheel braking system the compression springs 19 of the resilient coupling members are put under an initial compression to a predetermined degree equal as to each of the brakes. One simple and effective method of imposing upon the springs the desired amount of initial compression consists in taking each resilient unit such as is disclosed in detail in Figure 2 of the drawing, securing one or the other of the ends thereof to any suitable fixed support and suspending from the remaining end a weight equal to the initial compression to be imposed, say for example 200 pounds. By now adjusting the nuts 20 and 22 this adjusted condition of the spring may be permanently secured and maintained. In this manner all of the springs 19 are permanently maintained in a uniform state of compression and movement of each screw 16 relative to the associated yoke member 13 is prevented until a predetermined force is exerted on the coupling. When the brakes wear, the turn buckles 9 may be adjusted to change the relation of the brake shoes to the drums by changing the operative lengths of the brake rods. As above described, the resilient couplings are initially adjusted by suitable means to transmit a predetermined force, as, for example 200 pounds, before being assembled with the brake mechanism. Since the nuts 20 and 22 secure the initial compression of the springs 19 and take the thrust thereof there is no space between the surfaces $b$ and $c$, Figure 5, of the nuts 20 and yoke 13. The couplings are then assembled in place in the brake mechanism and the brake pedal is then pressed down to a predetermined pressure, as for example, 75 pounds, and the turn buckles are adjusted to take up any slack between the brakes and the initially stressed couplings. The turn buckles are adjusted to tighten up the brake rods so that the compression springs 19 of the couplings are compressed to permit the insertion of a feeler gauge $a$ between the surfaces $b$ and $c$ of the adjusting nuts 20 and yokes 13, respectively. When the turn buckles have been adjusted so that, for example, a .002 inch feeler gauge can be inserted between the faces $b$ and $c$ of each coupling, this will indicate that the brakes are equalized at the desired braking forces. It will be obvious that the springs 19, when once adjusted, will probably remain under equal compression at all times and that the only adjustment required periodically would be the adjustment of the turn buckles 9 to tighten up the brake rods for wear in the brake linings, the required adjustment to indicate that the brakes are equalized being determined by the application of the feeler gauge as pointed out above.

From the foregoing it will be observed that I have provided a common actuator for the front pair of brake rods and the rear pair of brake rods; that the coil compression springs 19, 19 of each pair of brake rods are of equal compression resistance; that the force required to compress the springs is greater than the maximum power required to properly apply the brakes and that the springs are therefore non-compressible during normal braking movements of the rods; that the stops respectively formed by the head 17 of the rod section 16 and the connecting portion or bight of the yoke member 13 are normally in contact with the ends of the springs; that the shoulders $b$ and $c$ remain in contact during normal braking operations; that whenever an unequal braking condition occurs between either the front brakes or the rear brakes an abnormal braking application of force to the common actuator will allow said shoulders, in one rod only, to separate and thereby indicate by the degree of their separation the degree of brake inequality; and that by pressing down the foot pedal 1 until one or the other of a pair of brake rod equipments shows a crack between the surfaces $b$ and $c$ and there locking said pedal the crack thus showing the degree of brake inequality may be measured by insertion of a feeler gauge $a$ as shown in Figure 5, and then by manipulation of the turnbuckle of the other of said pair of brake rods the aggregate length of said other rod portions 8 and 16 may be so shortened as to cause a temporary compression of the associated spring 19 and the appearance of a crack between the other nut and yoke surfaces $b$ and $c$ which when tested and found to be the same in degree as the first measured crack will assure an equalized relation of the brakes controlled by said pair of rods.

It should be understood that the uniformly compressed condition of the springs 19 effected prior to assembly of the braking equipment need never be disturbed during use of my equipment. The turnbuckle adjustment above referred to effects merely a temporary compression of the spring for brake equalization purposes and obviously does not vary the permanent spacing of the nuts 20 and rod heads 17. The equalization adjustments are thus effected without any real adjustment of spring compression and the desired initial uniform compression resistance of all of the springs is constantly maintained.

Although the invention has been disclosed in this application in its preferred embodiment for illustrative purposes only, it will be apparent that changes in form and arrangement of various elements will readily suggest themselves to those skilled in the art, and it is, therefore, to be understood that the invention is intended to cover a variety of different embodiments coming within the spirit and scope of the following claims.

I claim:

1. In a brake mechanism, the combination with a rock shaft; of two rock arms fixed to said shaft; means connected to the rock shaft for swinging said arms; and brake rods connected to the arms, each brake rod comprising two overlapping sections, one section being of a yoke construction and connected to the associated rock arm and the other section being adapted to be connected to the associated brake, said yoke including spaced arms connected to the associated rock arm and a connecting portion forming a stop and a shoulder, the overlapping end of the brake section being threaded and provided at its free end with a head forming a stop, the connecting portion of the yoke being formed with an opening for freely receiving the free end of the brake section, a coil spring disposed around the free end of each brake section and normally having its ends engaging said stops, said springs of both brake rods being of equal compression resistance, a sleeve on said threaded end and freely slidable in said opening, the outer end of the sleeve being provided with a shoulder normally engaging the shoulder of the rock arm section, and a nut threadably engaged with said threaded section and normally disposed against the sleeve.

2. In a brake mechanism, the combination with a rock shaft; of two rock arms fixed to said shaft; means connected to the rock shaft for swinging said arms; and brake rods connected to the arms, each brake rod comprising two overlapping sections, one section being of a yoke construction and connected to the associated rock arm and the other section being adapted to be connected to the associated brake, said yoke including spaced arms connected to the associated rock arm and a connecting portion forming a stop and a shoulder, the overlapping end of the brake section being threaded and provided at its free end with a head forming a stop, the connecting portion of the yoke being formed with an opening for freely receiving the free end of the brake section, a coil spring disposed around the free end of each brake section and normally having its ends engaging said stops, said springs of both brake rods being of equal compression resistance, a sleeve on said threaded end and freely slidable in said opening, the outer end of the sleeve being provided with a shoulder normally engaging the shoulder of the rock arm section, a nut threadably engaged with said threaded section and normally disposed against the sleeve, and means to vary the length of said rods without varying the spacing of said spring engaged stops.

3. In brake testing and equalizing means; the combination of a common actuator, and a pair of brake actuator rods connected to the actuator to be moved thereby simultaneously and in like degree and each including relatively movable sections having shoulders normally abutting but separable during certain braking operations and capable of indicating brake inequality by differences in their respective degrees of separation, spacer springs of equal strength serving to hold the shoulders in abutting relation, and means for adjusting the degree of separation of which the abutments are capable for a given brake application without varying the equalized effect of said springs.

4. In brake testing and equalizing means; the combination of a common actuator, and a pair of brake actuator rods connected to the actuator to be moved thereby simultaneously and in like degree and each including relatively movable sections having shoulders normally abutting but separable during certain braking operations and capable of indicating brake inequality by differences in their respective degrees of separation, spacer springs having uniform resistance to compression and serving to hold the shoulders in abutting relation, and turnbuckles enabling adjustment of the effective length of said rods without varying the uniform resistance to compression of said springs.

5. In a brake mechanism, the combination with a rock shaft; of two rock arms fixed to said shaft; means connected to the rock shaft for swinging said arms; and brake rods connected to the arms, each brake rod comprising two overlapping sections having relative slidable connection therebetween and respectively provided with spaced stops, one section being connected to the associated rock arm and the other section being adapted to be connected to the associated brake, a coil spring disposed around one section and having its ends normally engaging the spaced stops of the sections, said springs of both brake rods being of equal compression resistance, the overlapping end of the brake section being threaded, the stop of the rock arm section being provided with an opening for freely receiving the threaded end of the brake section, a sleeve on said threaded end and freely slidable in said opening, the outer end of the sleeve being provided with a head normally engaging the stop of the rock arm section, a nut threadably engaged with said threaded section and normally disposed against the head of the sleeve, and means for varying the effective length of said brake rods without varying the normal spacing of said stops.

6. An equalizing unit for brake mechanism comprising a connecting section terminating at one end in an apertured stop, a short brake rod section adapted for connection with a braking equipment and projected through and freely slidable in said apertured stop, a stop head on said brake rod section projected through said stop and spaced from said stop, an abutment head on said brake rod section and abutting said stop, a coil spring interposed between and engaging said stop and stop head and serving to yieldably hold said abutment head and stop in engagement, and means to vary the effective length of said brake rod section without altering the spaced relation of said stop and stop head.

7. An equalizing unit for brake mechanism comprising a yoke section having an apertured stop shoulder at one end and terminating at its other end in an actuator connecting means, a short brake rod section projected through and slidable in the yoke section aperture and terminating in a stop head disposed in spaced relation to said stop shoulder, a sleeve secured on said rod section and slidable in the yoke section aperture and having an abutment head portion for normally abutting the yoke section stop, a coil spring interposed between the stop head and the yoke section stop and serving to yieldably hold the yoke section stop and the abutment head in engagement, and a turnbuckle by which the effective length of the rod section may be varied without varying the degree of compression of said spring.

8. In brake mechanism; the combination of a common actuator; and a pair of brake actuator rods connected to the actuator to be moved thereby simultaneously and in like degree and each including a resilient coupling testing and equalizing unit comprising a yoke shaped member having an apertured bight portion and operatively connected to the actuator, a short rod section having a head slidable between the arms of the yoke shaped member and projecting through the aperture of the yoke, a coil spring surrounding said rod section within said yoke and abutting said head and bight portion, and a stop secured on said rod section and abutting said bight portion for permanently maintaining a normal predetermined precompression of said spring; said stop and bight portion of one or the other of said units being separable upon application of a given brake pressure to enable insertion of a feeler gauge to indicate the degree of inequality of brakes to which the brake rods are connected; and adjustable means connecting each brake rod portion to its associated brake rod whereby the effective length of the brake rod connected to the unit in which the stop and bight portions are not separated may be varied to cause a like separation of both sets of stops and bight portions thereby equalizing the brakes without disturbing the common resistance to compression of said springs.

CARL E. KORNELUK.